United States Patent [19]
Shackelford

[11] Patent Number: 6,128,630
[45] Date of Patent: *Oct. 3, 2000

[54] JOURNAL SPACE RELEASE FOR LOG-STRUCTURED STORAGE SYSTEMS

[75] Inventor: David M. Shackelford, Tucson, Ariz.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/993,546

[22] Filed: Dec. 18, 1997

[51] Int. Cl.[7] .................................................... G06F 17/30
[52] U.S. Cl. ........................... 707/204; 707/206; 714/114
[58] Field of Search ..................................... 707/204, 205, 707/206; 711/114; 364/243, 246; 714/21

[56] References Cited

U.S. PATENT DOCUMENTS

| | | | |
|---|---|---|---|
| 5,220,657 | 6/1993 | Bly et al. | 711/152 |
| 5,446,871 | 8/1995 | Shomler et al. | 364/332 |
| 5,491,780 | 2/1996 | Fyles et al. | 345/332 |
| 5,504,861 | 4/1996 | Crockett et al. | 364/332 |
| 5,581,724 | 12/1996 | Belsan et al. | 711/114 |
| 5,592,618 | 1/1997 | Micka et al. | 711/162 |
| 5,615,329 | 3/1997 | Kern et al. | 364/245 |
| 5,623,599 | 4/1997 | Shomler | 364/332 |
| 5,734,861 | 3/1998 | Cohen et al. | 707/206 |
| 5,813,009 | 9/1998 | Johnson et al. | 707/204 |
| 5,832,522 | 11/1998 | Blickenstaff et al. | 707/204 |

*Primary Examiner*—Wayne Amsbury
*Assistant Examiner*—Thu-Thao Havan
*Attorney, Agent, or Firm*—David W. Victor; Konrad Raynes & Victor LLP

[57] ABSTRACT

A log-structured storage is provided for use with journal data sets and a two-phase commit process. The log-structured storage provides a space release function for the journal data sets, wherein one or more portions of the journal data sets that are no longer required are marked as free space.

17 Claims, 2 Drawing Sheets

JOURNAL SPACE RELEASE FOR LOG-STRUCTURED STORAGE SYSTEMS

BACKGROUND OF THE INVENTION

1. Field of the Invention

This invention relates in general to improvements in the field of computer systems having log-structured storage, and more particularly, to a journal space release mechanism for journal data sets residing in log-structured storage.

2. Description of Related Art

Generally, log-structured storage organizes files by writing data to the end of a sequential byte stream known as a "log". The data contained by a file is typically accessed via pointers to sections of the log. When the file is deleted, the portions of the log which contained the file can be released for subsequent writing of new data. Since log-structured storage uses sequential blocks, the free space should be collected into a contiguous space to be most useful. This process is called cleaning.

Applications sometimes write data using a "two-phase" commit method. The two-phase commit method involves writing the update to a journal and then writing the update to the true target location. Once the data is hardened in the target location, the journal data is no longer needed. Current applications, such as databases or Extended Remote Copy, leave the old data in the journal data set until it becomes full, then starts writing new data at the beginning of the journal data set.

However, such methods are inefficient. When a journal is written to log-structured storage, the data which has been hardened to the target is not required, but simply takes up space. The cleaning process gains efficiency rapidly when useless data is released quickly.

In the case of temporary files, as soon as the data is no longer necessary, the file is deleted. This results in acceptable cleaning performance when temporary files are used. When journal data sets are interspersed with temporary files, costly data movement must occur to provide the necessary contiguous empty blocks to write new data.

Thus, there is a need in the art for new techniques for managing log-structured storage, and specifically, for managing journal data sets residing in log-structured storage. Such new techniques are provided by the invention described in this specification.

SUMMARY OF THE INVENTION

To overcome the limitations in the prior art described above, and to overcome other limitations that will become apparent upon reading and understanding the present specification, the present invention discloses an apparatus, method, and article of manufacture relevant to the storage of data on computers. Specifically, the present invention provides control functions for one or more journal data sets residing in a log-structured storage stored on the data storage device. Moreover, the present invention provides a space release function for the journal data sets in the log-structured storage, wherein one or more portions of the journal data sets that are no longer required are marked as free space.

An object of the present invention is to provide for more efficient data storage operations. Another object is to provide for enhanced performance in such data storage operations, especially when using a two-phase commit method. Yet another object is to reduce the overhead of using log-structured storage. A further object is to provide more reliable use of log-structured storage.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

The present invention solves problems associated with log-structured storage, and specifically, the problems associated with journal data sets. In the present invention, an application using a journal data set knows when the data in the journal data set is no longer required, i.e., when the data at the target location has been hardened, so that the corresponding data in the journal data set can be deleted. The log-structured storage of the present invention provides a space release function for journal data sets, which the application uses to mark the outdated data in the journal data set as being free space. When a cleaning process is executed for the log-structured storage, it does not have to move data in the journal data set unnecessarily, thereby resulting in a significant improvement in performance. Moreover, the application controls the invocation of the space release function, which provides a significant performance benefit over existing functions.

Hardware Environment

Figure 1:
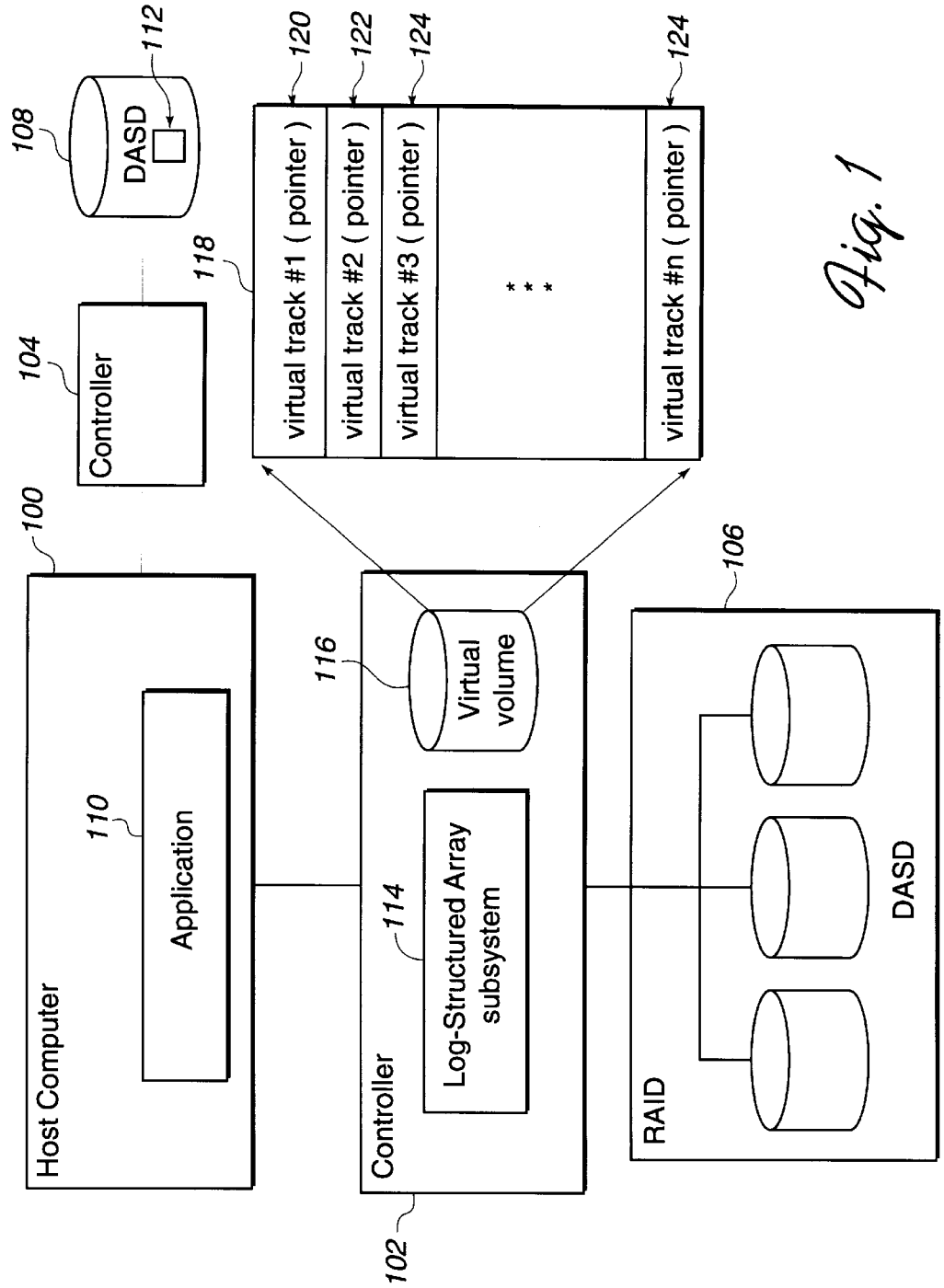
FIG. 1 is an exemplary hardware environment used to implement the preferred embodiment of the invention.

FIG. 1 is an exemplary hardware environment used to implement the preferred embodiment of the invention. A host computer 100 is coupled to one or more storage controllers 102 and 104, which themselves are coupled to one or more data storage devices 106 and 108. In the preferred embodiment, the data storage device 106 comprises a RAID (redundant arrays of inexpensive disks) storage subsystems, such as the RAMAC Virtual Array Storage System sold by IBM Corporation, the assignee of the present invention, whereas the data storage device 108 comprises a standard direct access storage device (DASD). Of course, those skilled in the art will recognize that any data storage device may be used with the present invention.

The host computer 100 executes one or more computer programs 110 that control the operation of the host computer 100 and its interaction with the storage controllers 102 and 104. In the preferred embodiment, the computer program comprises an application 110 that uses a two-phase commit process to update a target location 112 on data storage device 108 using a journal residing on the data storage device 106, although other computer programs may be used as well.

Similarly, the storage controller 102 includes one or more computer programs 114 or other logic that controls the operation of the storage controller 102 and its interaction with the host computer 100 and data storage device 106. In the preferred embodiment, the computer program 114 comprises a log-structured array (LSA) subsystem 114 that provides the access logic for the data storage device 106, although other functions may be provided as well.

The LSA subsystem 114 constructs one or more "virtual volumes" 116 in the memory of the storage controller 102 for access by the host computer 100. The virtual volume 116 emulates a standard DASD for data stored by the LSA subsystem 114 on the data storage device 106. In this emulation, the host computer 100 (or any computer program executed thereby) "views" the virtual volume 116 of the LSA subsystem 114 as a normal data volume, i.e., a standard DASD, with sequentially numbered tracks.

To accomplish this emulation, the LSA subsystem 114 maintains a virtual track table in the memory of the storage controller 104 for each virtual volume 116, wherein the virtual track table comprises one or more sequentially numbered virtual tracks 118 and each of the virtual tracks 118 comprises one or more pointers 118 that reference storage locations on the data storage device 106. In the example of FIG. 1, the virtual tracks 118 of the virtual volume 116 maintained by the LSA subsystem 114 are used to store, for example, temporary files 120, free space 122, and journal data sets 124.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Those skilled in the art will also recognize that the present invention may be implemented as a method, apparatus, or article of manufacture using standard programming and/or engineering techniques to produce software, firmware, hardware, or any combination thereof. The term "article of manufacture" (or alternatively, "computer program carrier") as used herein is intended to encompass any device, carrier, or media that provides access to instructions and/or data useful in performing the same or similar functionality. Of course, those skilled in the art will recognize many modifications may be made to this configuration without departing from the scope of the present invention.

Operation of the Journal Space Release

The LSA subsystem 114 provides a space release function for the journal data sets 124 stored on the virtual volume 116. This function is a basic requirement for effective clean-up of unused space in the journal data sets 124.

The application 110 is able to determine that the journal data set 124 being used is stored in the virtual tracks 118 of the virtual volume 116 (i.e., log-structured storage) maintained by the LSA subsystem 114. The application 110 first logs the updates to the journal data set 124 stored in the virtual tracks 118 of the virtual volume 116. The application 110 then applies the updates to the target location 112 residing on the DASD 108. When the journal data set 124 is stored in the virtual tracks 118 of the virtual volume 116 maintained by the LSA subsystem 114 and the second phase of the two-phase commit method completes, i.e., the update to the target location 112 harden, the application 110 invokes the space release function of the LSA subsystem 114 to mark as unused space some or all of the journal data set 124. This unused space in journal data set 124 is then be consolidated by a cleaning process performed by the LSA subsystem 114.

Flowchart

Figure 2:
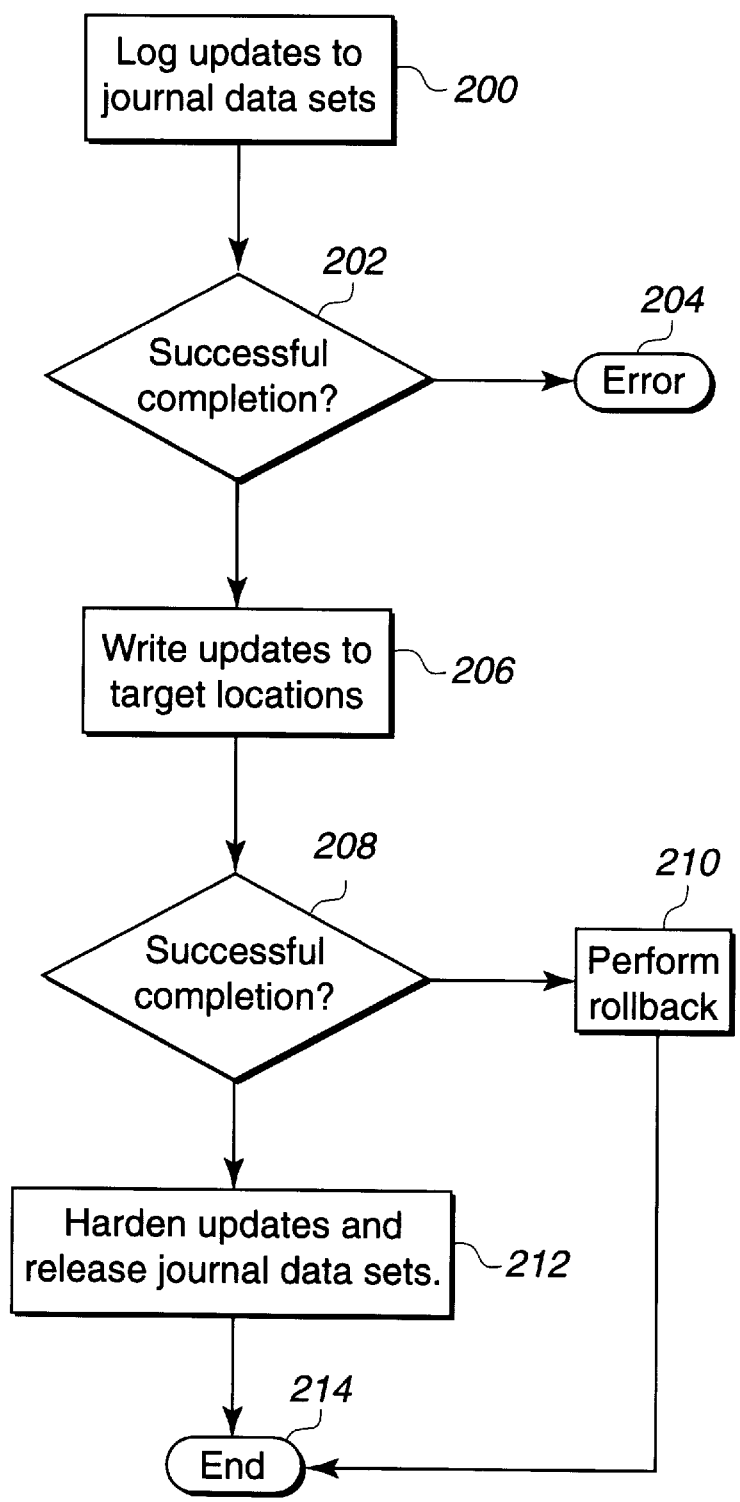
FIG. 2 is a flowchart illustrating the logic performed by the application according to the present invention.

FIG. 2 is a flowchart illustrating the logic performed by the application 110 according to the present invention.

Block 200 represents the application 110 writing one or more updates to one or more of the journal data sets 124.

Block 202 is a decision block that represents the application 110 waiting for completion indicators for the write operations to the journal data sets 124 to be returned and determining whether all of the completion indicators indicate a successful completion. If not, control transfers to Block 204; otherwise, control transfers to Block 206.

Block 206 represents the application 110 writing one or more updates to one or more of the target locations 112.

Block 208 is a decision block that represents the application 112 waiting for completion indicators for the write operations to the target locations 112 to be returned and determining whether all of the completion indicators indicate a successful completion. If not, control transfers to Block 210; otherwise, control transfers to Block 212.

Block 210 represents the application 112 performing a rollback operation to back out any changes made to the target locations 112.

Block 212 represents the application 110 hardening the updates to the target locations 112 and then instructing the LSA subsystem 114 to perform a journal space release function for the journal data sets containing the updates previously written by the application 110. The journal space release function marks unused space in the journal data sets 124 as free space, so that a cleaning process performed by the LSA subsystem 114 can reclaim and consolidate the portions the free space.

Conclusion

This concludes the description of the preferred embodiment of the invention. The following paragraphs describe some alternative methods of accomplishing the same objects.

In alternative embodiments of the present invention, other types and configurations of computers could be used. For example, the invention need not be restricted to the hardware and software configuration illustrated herein. For example, other mainframes, minicomputers, personal computers, or networks of computers could be used with the present invention. In another example, peripherals other than those illustrated herein could benefit from the present invention.

In alternative embodiments of the present invention, data storage structures other than log-structured storage could be used. In addition, the invention need not be restricted to journal data sets as illustrated herein. Further, the target location and the journal data sets could reside on the same data storage devices rather than different data storage devices.

In alternative embodiments of the present invention, other logic than that described herein could be performed without departing from the scope of the present invention. For example, the invention need not be restricted to the exact steps or elements illustrated herein.

In summary, the present invention discloses an apparatus, method, and article of manufacture relevant to the storage of data on computers. Specifically, the present invention provides control functions for one or more journal data sets residing in a log-structured storage stored on the data storage device. Moreover, the present invention provides a space release function for the journal data sets in the log-structured storage, wherein one or more portions of the journal data sets that are no longer required are marked as free space.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A system for storing data sets, comprising:
   (a) a storage device;
   (b) a computer in communication with the storage device; and
   (b) one or more computer programs, executed by the computer, for performing:
      (i) receiving updates to data sets to apply to target locations on the storage device;
      (ii) storing a copy of the updates to the data sets in one or more journal data sets residing in a log-structured storage stored on the data storage device, wherein the journal data sets provide temporary storage of updates to data in the log structured storage;
      (iii) transferring the updates to the data sets to the target locations; and
      performing a space release function after completing the transfer of the updates to the target locations to mark one or more portions of the journal data sets as free space wherein the journal data sets marked as free space are capable of being reused to store journal data sets for subsequent updates.

2. The system of claim 1 above, wherein the computer program further comprises means for performing a cleaning process to reclaim and consolidate the portions of the journal data sets marked as free space.

3. The system of claim 1 above, wherein one or more portions of the log-structured storage are comprised of one or more journal data sets.

4. The system of claim 1 above, wherein one or more portions of the log-structured storage are comprised of one or more temporary files.

5. The system of claim 1 above, wherein the computer program further comprises means for using the log-structured storage to perform a two-phase commit.

6. The system of claim 1 above, wherein the computer program further comprises:
   (1) means for receiving a request to update a target location;
   (2) means for logging the update to the journal data set residing in the log-structured storage;
   (3) means for attempting to update the target location in accordance with the request;
   (4) means for backing out the update from the target location when the attempted update fails;
   (5) means for hardening the update in the target location when the attempted updated succeeds; and
   (6) means for releasing the logged update from the journal data set residing in the log-structured storage when the attempted updated succeeds.

7. The system of claim 1 above, wherein the means for logging comprises means for allocating a journal data set in the log-structured storage and means for logging the update into the journal data set.

8. The system of claim 1 above, wherein the computer program further comprises means for indicating that a journal data set resides in the log-structured storage.

9. The system of claim 8 above, wherein the computer program further comprises means for releasing free space in the journal data set residing in the log-structured storage.

10. The method of claim 1, further comprising:
   receiving a request to update a target location;
   logging the update to the journal data set residing in the log-structured storage;
   attempting to update the target location in accordance with the request;
   backing out the update from the target location when the attempted update fails;
   finalizing the update in the target location when the attempted updated succeeds; and
   releasing the logged update from the journal data set residing in the log-structured storage when the attempted updated succeeds.

11. A method for storing data sets on a storage device, comprising:
   receiving updates to data sets to apply to target locations on the storage device;
   storing a copy of the updates to the data sets in a journal data set in a log-structured storage stored on the data storage device, wherein the journal data sets provide temporary storage of updates to data in the log structured storage; and
   transferring the updates to the data sets to the target locations; and
   executing a space release function after completing the transfer of the updates to the target locations to mark one or more portions of the journal data set including the updates written to the target locations as free space, wherein the journal data sets marked as free space are capable of being reused to store journal data sets for subsequent updates.

12. The method of claim 11, further comprising performing a cleaning process to reclaim and consolidate the portions of the journal data sets marked as free space.

13. The method of claim 11 above, further comprising releasing free space in the journal data set residing in the log-structured storage.

14. An article of manufacture embodying one or more instructions executable by a computer having a data storage device coupled thereto, comprising:
   receiving updates to data sets to apply to target locations on the storage device;
   storing a copy of the updates to the data sets in a journal data set in a log-structured storage stored on the data storage device, wherein the journal data sets provide temporary storage of updates to data in the log structured storage; and
   executing a space release function after completing the transfer of the updates to the target locations to mark one or more portions of the journal data set as free space, wherein the journal data sets marked as free space are capable of being reused to store journal dat sets for subsequent updates.

15. The article of manufacture of claim 14, further comprising performing a cleaning process to reclaim and consolidate the portions of the journal data sets marked as free space.

16. The article of manufacture of claim 14, further comprising:
   receiving a request to update a target location;
   logging the update to the journal data set residing in the log-structured storage;
   attempting to update the target location in accordance with the request;
   backing out the update from the target location when the attempted update fails;
   finalizing the update in the target location when the attempted updated succeeds; and
   releasing the logged update from the journal data set residing in the log-structured storage when the attempted updated succeeds.

17. The article of manufacture of claim 16, above, further comprising releasing free space in the journal data set residing in the log-structured storage.

* * * * *